Sept. 22, 1925.

A. E. OSWALD 1,554,647

ELECTRIC MOTOR

Filed Nov. 30, 1920

Inventor:
Alfred E. Oswald
By B.A. Stickney
Attorney

Sept. 22, 1925.

A. E. OSWALD

ELECTRIC MOTOR

Filed Nov. 30, 1920

Inventor;
Alfred E Oswald
By D C Stickney
Attorney

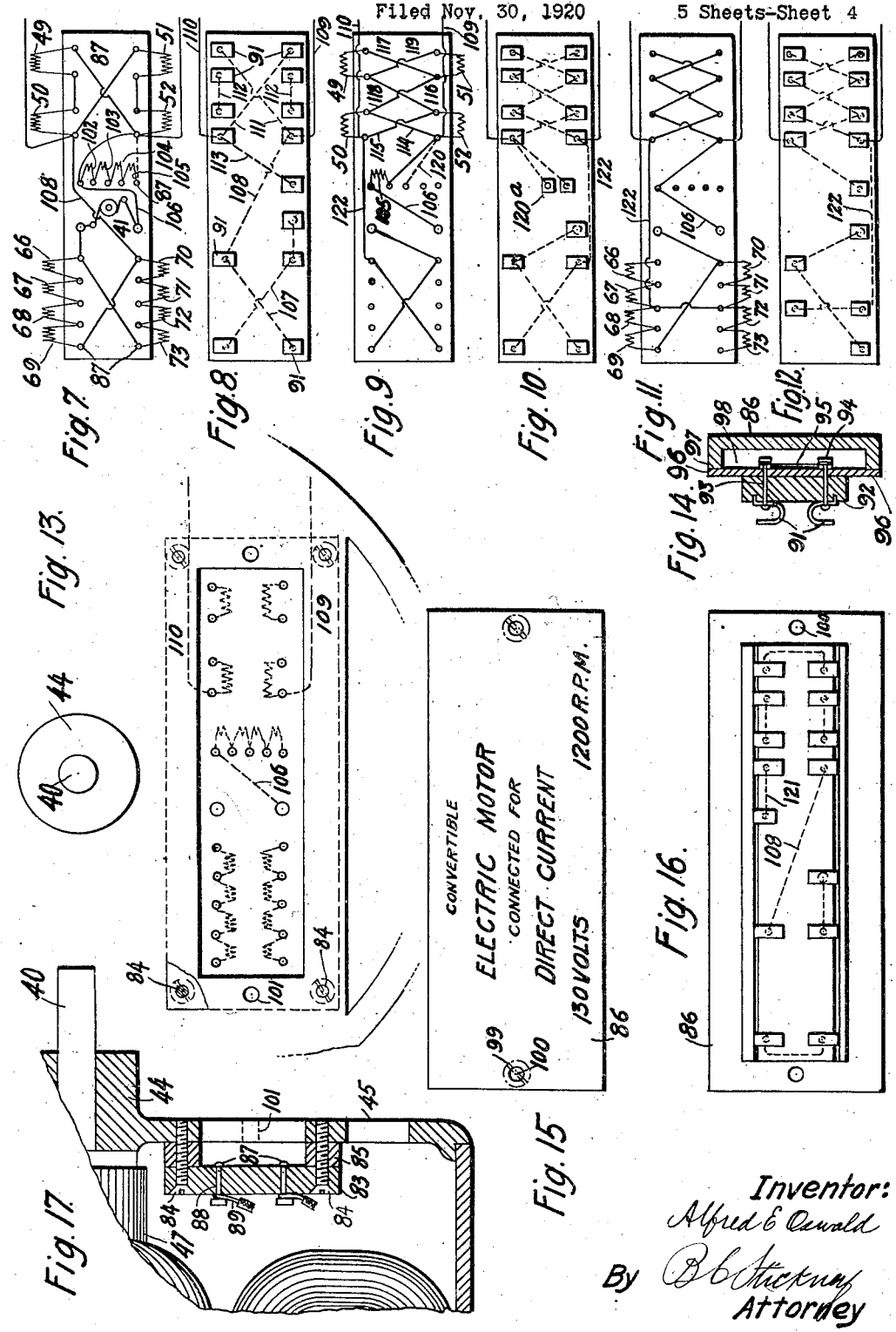

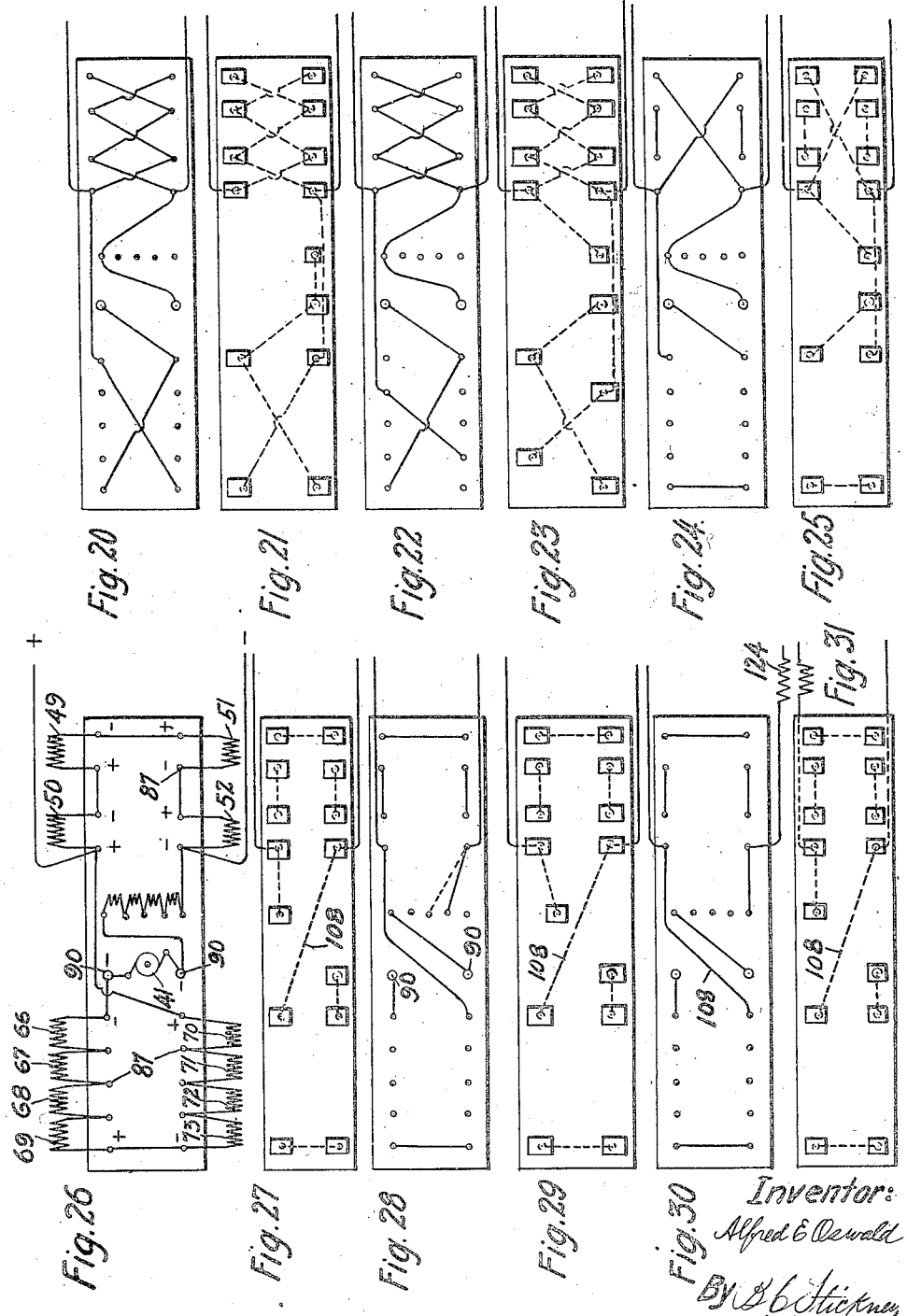

Patented Sept. 22, 1925.

1,554,647

UNITED STATES PATENT OFFICE.

ALFRED E. OSWALD, OF BOGOTA, NEW JERSEY, ASSIGNOR TO UNDERWOOD TYPE-WRITER COMPANY, OF NEW YORK, N. Y., A CORPORATION OF DELAWARE.

ELECTRIC MOTOR.

Application filed November 30, 1920. Serial No. 427,346.

*To all whom it may concern:*

Be it known that I, ALFRED E. OSWALD, a citizen of the United States, residing in Bogota, in the county of Bergen and State of New Jersey, have invented certain new and useful Improvements in Electric Motors, of which the following is a specification.

This invention relates to electric motors, and one of its main objects is to adapt the motor for work under a wide variety of conditions, thereby substantially increasing its range of usefulness.

Many of the improvements relate to the use of the motor only with alternating current; but provision is also made for converting it into a direct current motor without substantially changing the same. The motor may be used for any commercial frequency and a great range of voltage. The conversion of the motor for different circuits may be made by an inexperienced person. It has great value for motors of less than one horse power, although the invention is not limited thereto. It is well adapted for frequent starting and stopping. The number of motors that a manufacturer needs to produce in order to meet widely varying demands may be greatly reduced.

One of the main objects of the invention is to control the speed of an alternating current motor, so that the speed will be substantially constant without load, or for various loads within its rated capacity.

For alternating current I employ a commutator, which connects the rotating armature in series with novel stationary auxiliary coils, and I control the speed by means of a novel relationship between the armature auxiliary coils and field coils. The field coils are in shunt around both the armature and auxiliary coils, the last being electrically opposed to the field coils, and acting in conjunction with a novel core in a manner to render the rotor self-corrective as to speed under varying loads. The problem of adapting the motor for different frequencies is solved by winding for the highest frequency and connecting the field coils, and also the auxiliary coils, in parallel, series or otherwise. The motor is adapted for different voltages in alternating work, by further modifying or rearranging the relationship between the coils or sub-coils; numerous combinations being feasible. The desired rate of rotation is secured by certain modifications of such arrangements.

It is usual to wind motors differently for different frequencies, so that a motor that is wound for one circuit cannot be successfully used on another circuit having a different frequency. Therefore, it is necessary for a dealer to keep a great variety of motors in stock. One of the objects of the invention is to produce a motor that will successfully operate in different circuits having different frequencies.

It is usual also to wind motors differently for use with circuits having different voltages, and this also makes it impracticable to use the same motor on different circuits, and further makes it necessary to keep a variety of motors in stock. Since also the voltage varies in different circuits having the same frequency, a further complication ensues; and it has been necessary, therefore, to keep a very large variety of motors in stock. One of the objects of this invention is to overcome this difficulty also, and to produce a motor that can be used for circuits having different voltages; and the improvement is carried so far that the motor can be used with circuits having different frequencies as well as different voltages for the same frequency.

This motor can be used with an alternating current not only for different frequencies and different voltages, but also for different speeds, as may be required, thereby still further enlarging the field of usefulness of the invention and making possible still further reduction in the assortment of motors that it is necessary to carry in stock.

It has not heretofore been found practicable to use the same motor for either alternating or direct current where constant speed is desired, thus again making it necessary for the dealer to keep special motors in stock, and for the manufacturer to put out a large line in order to meet the various requirements. One feature of the present invention is the provision of a constant speed alternating motor that can be successfully used for direct current.

It will be hereinafter explained at length how the aforesaid auxiliary coils give many advantages. The reduction of inductance is one of the results of their use. These auxiliary coils are valuable for this purpose, whether or not the self-regulation of speed is also present. The auxiliary coils take part in regulating the speed, and also enlarge the range of frequencies with which the motor can be successfully used, and also aid in starting the motor, inasmuch as they overcome the inductance of the armature when the latter is at rest.
Another advantage resulting from the employment of these auxiliary coils for these ends arises because, by reversing the connections of the auxiliary coils, the motor may also be used for direct current with shunt-wound characteristics.

One feature of improvement is the facility and certainty with which the connections can be changed, even by one unfamiliar with the motor. There is provided in the motor-frame a board or plate on which is arranged a full set of terminals for the different coils, the armature and the resistance. Upon a separate board or plate attached thereto and removable therefrom, are arranged the necessary contacts having appropriate connections for the work in hand. Each removable contact plate may be marked to indicate the work that will be performed by the motor when said plate is fastened thereto. An assortment of these removable plates may be kept in stock, so that when a dealer receives an order for a motor for either alternating or direct current, and for a certain frequency and a certain voltage and speed, he needs only to select the plate which is marked for such current, frequency, voltage and speed, and secure the same upon the motor, whereupon it is ready for the customer's use.
Other features and advantages will hereinafter appear.

In the accompanying drawings,

Figure 1 is a cross-section of the body portion of one form of motor embodying the present improvements.

Figure 1ª is a small side view of the motor, to illustrate the method of securing the magnet loops or keepers.

Figure 4A:
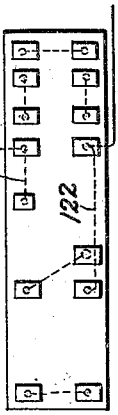
Figure 4 shows a loop or keeper portion of the iron core seen at Figure 3.
Figure 4:
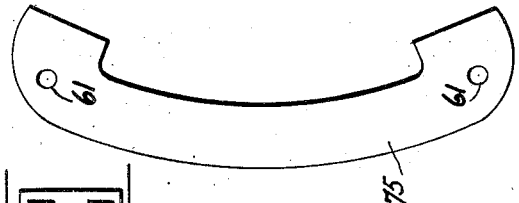
Figure 6:
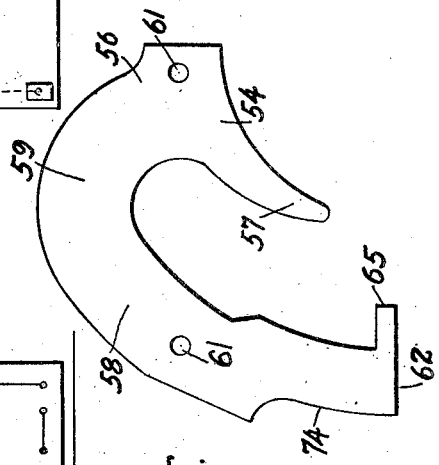

Figure 4ª is an inverted plan of a contact plate for use in connecting up the coils in the manner indicated at Figure 6ª, whereby the motor may be altered or converted into a 220-volt 30 cycle alternating current motor.

Figure 3:
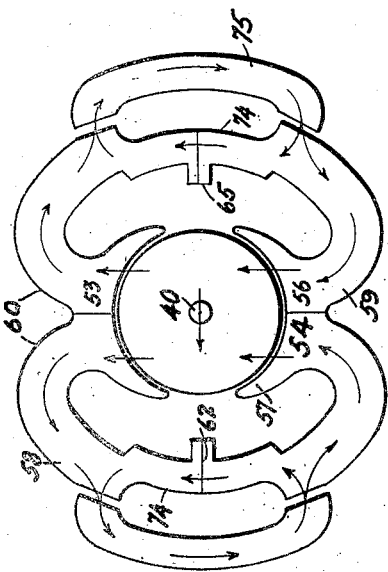
Figure 3 is a diagram to illustrate the magnetic relationship of armature and field when the motor is connected for alternating current.
Figure 5:
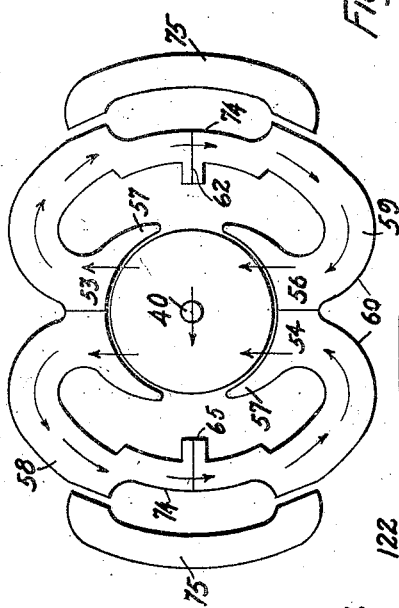
Figure 6A:
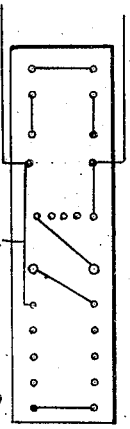

Figure 5 is similar to Figure 3, but shows the magnetic circuit when the motor is used for direct current (the magnetic loops not functioning).

Figure 6 shows one of the plates preferably used in building up the laminated magnet or core; this plate being in the form of a segment, and four of them suitably placed completing one lamina of the core.

Figure 6ª is a diagram of the connections for A. C. 220 volts, 30 cycles, 1200 R. P. M.

Figure 7 is a diagram of the connections when the motor is to be used for direct current, 50 volts. In this and the remaining diagrams to Figure 31, the connections are for 1200 revolutions per minute.

Figure 8 is an inverted plan of the contact plate which is screwed in place in the end of the motor to produce the connections seen at Figure 7, thereby altering or converting the motor as explained in connection with Figure 7.

Figure 9 is a diagram of the connections when the motor is to be used for alternating current, 40 cycles, 130 volts.

Figure 10 is an inverted view of the companion contact plate.

Figure 11 is a diagram of the connections when the motor is to be used for alternating current, 120 volts, 60 cycles. The same diagram can be used when both the voltage and the cycles are doubled, that is, 240 volts and 120 cycles; and the same rule applies to the other diagrams.

Figure 12 is a companion diagram of the contact plate.

Figure 13 is a view of the end portion of the motor frame, to illustrate a terminal board or plate mounted therein, for use with any of the contact plates seen at other figures.

Figure 14 is a cross-section, Figure 15 is a top plan and Figure 16 is an inverted plan of one form of contact plate to be fastened to the machine, with its contacts for engaging the terminals seen at Figure 13, whereby the motor is alterable for use with direct current, 130 volts.

Figure 17 is a fragmentary sectional view to illustrate in cross-section the arrangement of the contact plate seen at Figure 13.

Figure 18 is a sectional view of a copper tube or jacket used as a magnetic impediment.

Figure 19 is a cross-sectional view of the copper jacket.

Figure 20 is a diagram of the connections employed for alternating current, 120 volts, 40 cycles.

Figure 21 is an inverted plan of the plate having suitable contacts to co-operate with the terminal plate seen at Figure 13, in establishing the connections indicated at Figure 20.

Figure 22 is a diagram of the connections when the motor is to be used for alternating current, 120 volts, 50 cycles.

Figure 23 is a contact plate for establishing the connections seen at Figure 22.

Figure 24 is a diagram of the connections for alternating current, 220 volts, 40 cycles.

Figure 25 is a companion view to Figure 24, showing the contact plate.

Figure 26 is a diagram of the wiring of the motor for 130 volts, direct current. The general relation of the coils and armature to the terminals is illustrated at this figure, and it is to be understood in connection with the other diagrams, Figures 20, 22, 24, 28, 30, etc.

Figure 27 is the contact plate for establishing the connections indicated at Figure 26.

Figure 28 is a diagram of the connections for 120 volts, but otherwise the same as at Figure 26.

Figure 29 is the contact plate for Figure 28.

Figure 30 is a contact diagram for using the direct current, 220 volts.

Figure 31 is a contact plate for Figure 30.

Figure 1:
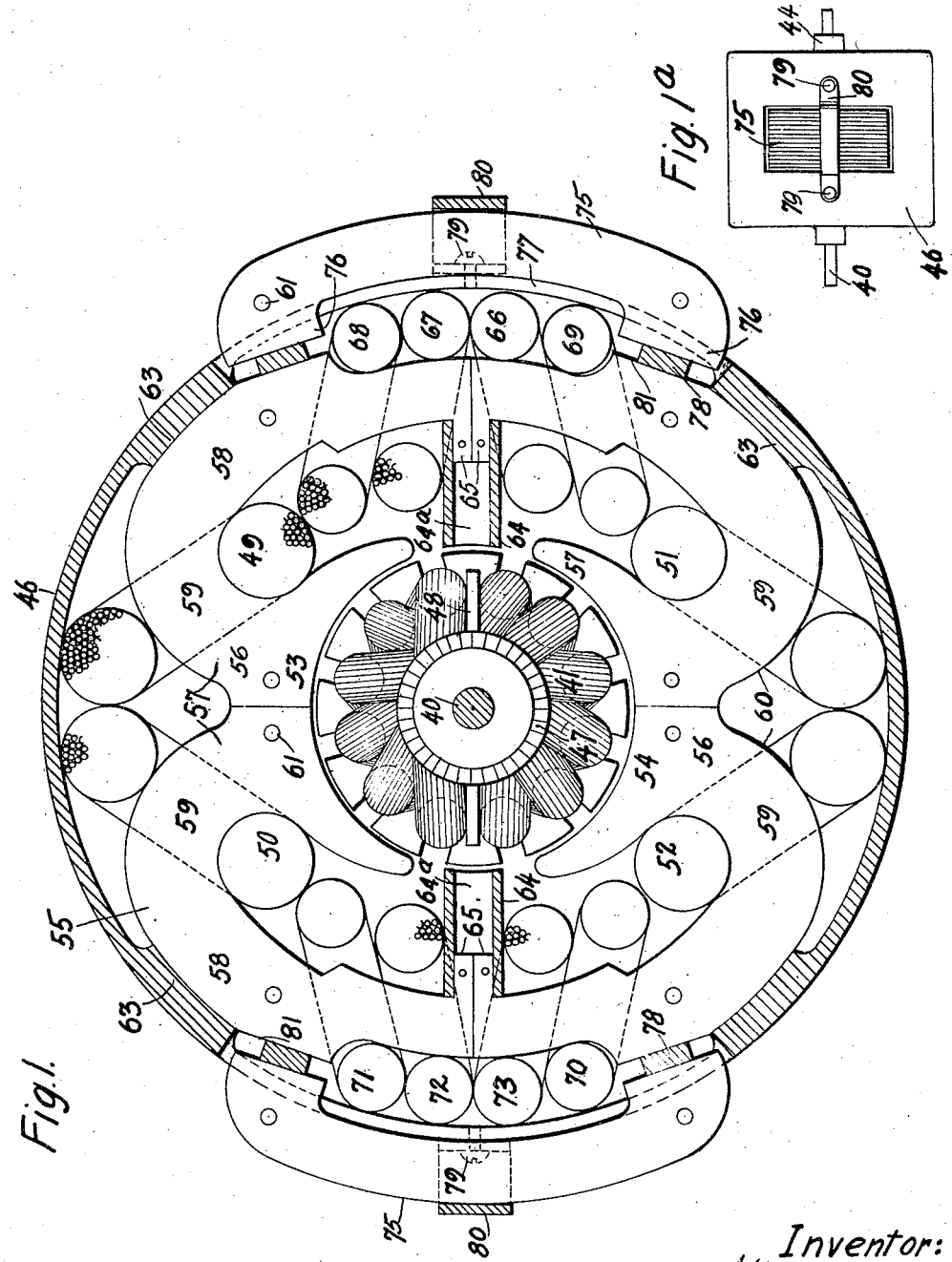

As a preliminary to the detailed description, it is here generally stated that a broad feature of improvement resides in the coils which are auxiliary to the armature, and which co-operate with the shunt field coil or coils to control the speed. One example of these auxiliary coils is shown at Figure 1, but the invention is not limited to the number, arrangement, or other details there seen.

Proceeding from the foregoing general statements to a more detailed description, the motor shaft is seen at 40, carrying an armature 41, comprising standard windings 42 suitable for alternating current, or fewer than would be the case with a corresponding direct current motor. The laminated core of the armature is indicated at 43. Said shaft is journaled in bearings 44 carried by spider-like heads 45 of the framework, which also comprises a barrel, drum or casing 46. The armature is provided with a commutator 47 to cooperate with brushes 48.

The field coils are marked 49, 50, 51, 52, preferably two at each pole of the magnet, and capable of being connected in either series or parallel at each pole. The opposite poles are marked 53, 54, and these project inwardly from a magnet core which is designated generally as 55, and which is roughly of annular or continuous form; the pole pieces being, of course, placed close to the armature and extending around the same, preferably until they nearly meet. Said pole pieces extend from neck portions 56 provided upon the magnet core, and said coils 49—52 are arranged at said neck portions, but in place of arranging these field coils conventionally around the neck, they are divided into sub-coils or portions, as shown, and each portion is placed with one of its sides occupying a position between the horn 57 of the pole-piece and the body portion 58 of the magnet core; said portion 58 connected by a bend 59 to the neck 56, and the field coil extending around the bend and occupying a notch or cut-away portion 60, which is formed in the magnet core at the occurrence of the bends 59.

Figure 2:
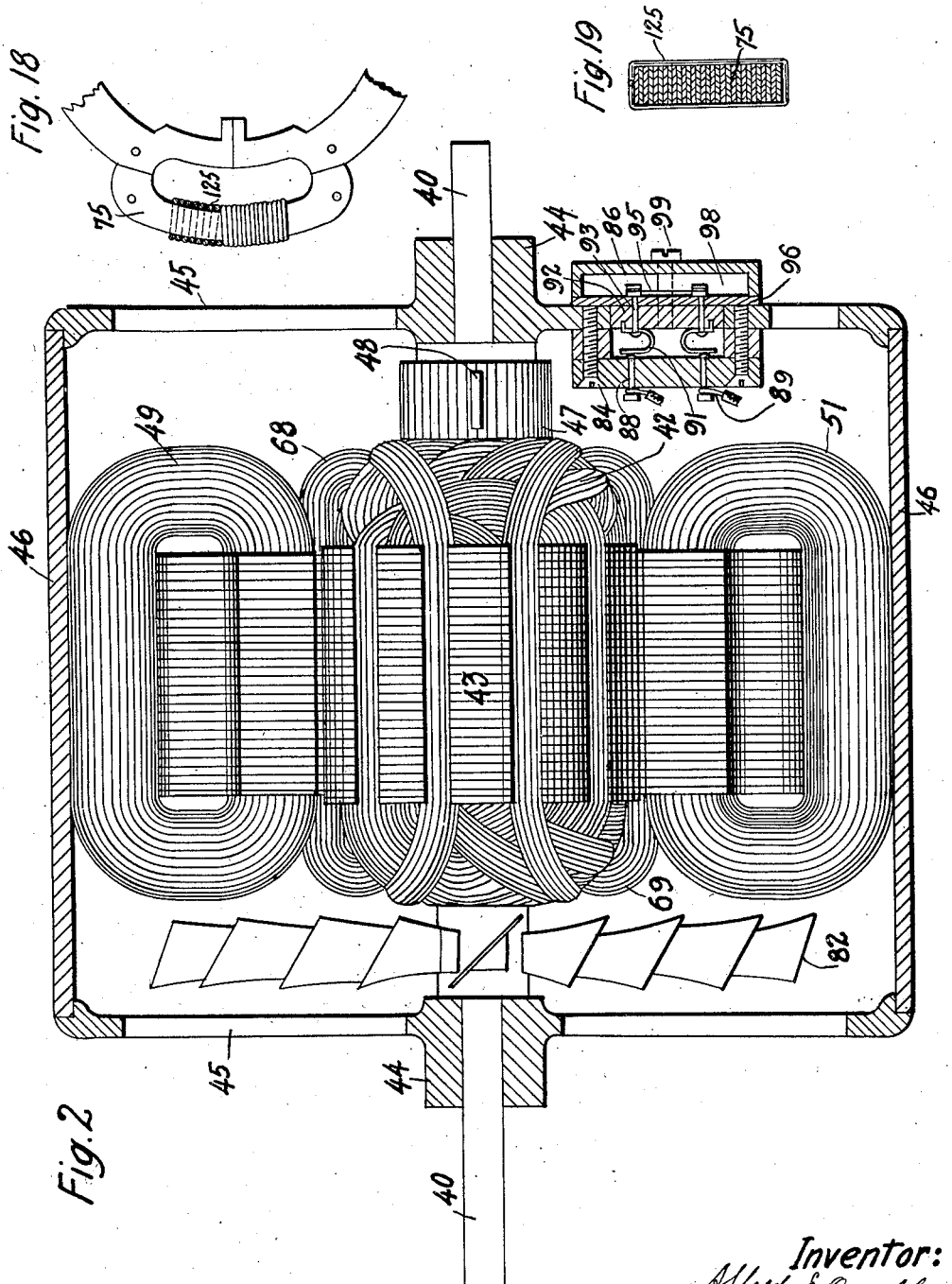
Figure 2 is a longitudinal section of the motor.

Each of the coils 49—52 is preferably in the form of an elongated loop, Figure 2, wound across the bends 59, which permits a larger length of wire and larger wire to be used, whereby more resistance and inductance are obtained as compared with what would be the case if the coils were wound across the wide neck 56, because lack of room would not permit as much wire to be used as when wound across the bends 59. Moreover, each of the field coils may be wound separately and placed as a unit upon the magnet, which, for this purpose, may be made of four quadrants, segments, or portions, one of which is seen at Figure 6; the laminations being held together by dowels or rivets 61. These portions are preferably alike, four of them completing the magnet. The coils 49, 50, 51, 52 may be slipped over the neutral ends 62 of the quadrants before the latter are assembled in the casing 46; the latter preferably having four internal bearings 63, whereby the quadrants or other magnet portions are supported and confined or held together; the assembled magnet and coils being inserted endwise in said casing, and the quadrants being additionally fastened by tubular clips 64, which fit over contiguous lugs 65 formed on the adjoining quadrants at their neutral ends, one clip for all the lugs at each side of the motor. These tubular clips may be made of copper or brass enclosing laminated iron 64ª, and may project close to the armature, to form interpoles and reduce or prevent sparking at the commutator.

Besides the foregoing advantages, there is the further advantage that this division of the field windings into two coils at each pole of the magnet favors the proper operation of the motor with alternating current, inasmuch as the magnetism generated by the two coils may be equal, and hence the bodies of the magnets extending in opposite directions from said coils may be equally affected, thus assuring proper co-operation or balance of the field coils 49—52 with respect to the auxiliary coils, which are designated as 66 to 73 and are placed midway between the pole pieces of the magnet. A certain amount of separation of coils 49—50 and 51—52 is secured by placing them around the bends 59, this separation tending to favor the working of each coil with respect to the auxiliary coils, without undue interference from the other field coils.

The auxiliary coils 66, 67, 68, 69, at one side of the motor, may be formed separately and placed as units over the sections of the magnet before they are assembled in the motor and the same is true of the auxiliary coils 70, 71, 72, 73 in the opposite side of the ring. These auxiliary coils have so many windings and are so bulky that the quadrants or segments may be cut away at 74 (Figures 3 and 5) to give room for the coils within the cylindrical casing 46, see Figure 1; the four coils at their outer portions being confined in the recess formed by the adjoining cutaways 74. At their inner portions the coils may be confined between the tubular clips 64 and the field coils 49—52.

From the foregoing, it will be understood that when the motor is being used for direct current, the entire annulus forms a single magnet core, inasmuch as all the field coils and auxiliary coils produce magnetism in the same direction; but when the motor is used for alternating current, the auxiliary coils 66—73 taken together form the middle or neutral portion of the annulus into a separate magnetic field, which works against the two magnetic fields formed by the field coils 49—52; return paths for the magnetic circuit being provided by laminated iron loops or by-passes 75 in the form of keepers, which may be conveniently mounted outside of the cylindrical motor casing and provided with projections 76 that extend within slots 77 formed in the casing, and they may be held against wooden or other nonmagnetic insertions 78 by means of screws 79 and straps 80, Figure 1ᵃ, the straps passing across the laminations of the keepers and the screws being threaded into the casing. Adjustment of the keepers may be towards and away from the annular magnet core, and may be secured by substituting thinner or thicker insertions 78 and tightening up the screws 79. The space between the projections 76 may be opposite to the recesses 74, and the annular magnet core may have faces 81 parallel with and opposite the projections 76 or matching the same, so as to make it convenient to secure just the right air or other gap between the main magnet core and the loops or keepers, which themselves form separate magnetic cores, although only affording a return path for the magnetism of the annular magnet core.

Upon the shaft may be provided if desired a fan 82 to keep the motor cool when using alternating current.

It will be seen that in an alternating motor the same iron ring or core may be used for both field and auxiliary coils, the field coils being electrically opposed by the auxiliary coils; resembling the arrangement of an ordinary transformer, although the coils are all connected to the same mains, one pair in shunt around the other. The coils offer less inductance than would exist in a transformer. Said auxiliary coils are preferably equidistant from the poles of the field magnets. The magnetic circuits are not completed through said iron core. To avoid causing the magnetism to meet with excessive resistance in completing its return through the air, and to preserve the same inductance in the coils, and avoid too great a flow of current through all the coils, I employ the loops of iron. The magnetic circuit for each auxiliary coil includes one of the loops and also that part of the main core around which the auxiliary coil is wound; while the magnetic circuit for the field coils consists partly of the main core and partly of said loops, in which the direction of the magnetism is the same for the coils which oppose each other.

In order to prevent the inductance from being too great, and to have the coils react properly upon each other through the main core, the magnetic circuits through the loops are provided with impediments. The inductance is kept down to the desired point, but not below it. There is secured the phasing of the circuits and speed-regulation. Since each gap or other impediment is placed in a loop, and since each loop is included in both field and armature magnetic circuits, the effect of the gap is the same upon one magnetic circuit as upon the other. These gaps are preferably made in the core loops at the points where they branch from the main core or ring.

The further advantage is seen that the organization, whereby the results are obtained, is also suitable for use with direct current, without substantial change.

It is also noted that a tendency of the armature to over-speed and thereby reduce the inductance, has the effect of permitting more current to flow from the mains through the armature circuit, and as a result more current flows from the mains through the field circuit, the condition being analogous to that in a transformer.

At Figure 17 is shown a section of a terminal plate 83 of insultaing material secured upon the inner side of the head 45 by means of screws 84; spacing collars 85 being placed upon the screws to position the terminal plate 83 well within the head, so as to accommodate contact plate or block 86, see Figures 2 and 14, which is removable and hence omitted from Figure 17. The terminals on the plate 83 are in the form of heads 87 formed on posts 88 in the terminal plate which are connected to the ends of the various windings or coils. The arrangement of the terminals in the terminal plate is seen at Figure 26, which also shows a diagram of the coils, etc., the commutator terminals being indicated at 90. Appropriate contacts 91 see Figures 2 and 14, project from the contact plate 86, which comprises an insulating block 92 to which they are secured by copper rivets 93, the heads 94 of which may be electrically connected by wires 95 in various ways to meet various requirements. The block 92 may be secured to the bottom of a plate 96, Figure 14, which, together with the contact plate 86, may form a box having sides 97 and ends 98 to contain the wires 95 and heads 94. Screws 99 may pass down through holes 100 in the cover plate 86 and the bottom plate 96 and thread into holes 101, Figure 17, in the head 45 of the motor casing for detachably securing the device in position with the contacts engaging the appropriate terminals 87.

At Figure 7, which shows connections for direct current, 50 volts, the field coils 49, 50 are in series with each other and in parallel with the field coils 51, 52, the latter being also in series with each other, thereby making a semi-parallel field of lower resistance, suitable for the low voltage. For the same reason the auxiliary coils 66 to 69 are connected in parallel with the auxiliary coils 70 to 73 throughout the diagram; that is, 66 to 69 are all in series, and the same is true of 70 to 73. These auxiliary coils are always connected up to help the field coils for direct current, and are in series with the armature 41 in all the drawings. At Figure 7 and in all the remaining diagrams is shown a resistance comprising coils 102, 103, 104, 105, but for the low voltage of 50 none of this resistance is needed. If the voltage were increased to 60, then coil 102 would be cut in, and so on for higher voltages.

At Figure 8 is shown an inverted plan of the contact plate for co-operating with the set of terminals 87 to effect the connections seen at Figure 7. This Figure 8 shows contacts for all of the field coil terminals, and these contacts are so wired as to secure the desired parallel between the subsets of field coils and also between the subsets of auxiliary coils. The auxiliary coils, the armature, and the resistance are in series in all the diagrams. At Figures 7 and 8 each pair of filed coils is independently connected across the line, or in shunt around the armature circuit. At Figure 7 is shown a wire 106, which is provided at each of the terminal plates 83 throughout the drawings, for permanently connecting one terminal of the armature circuit with the last of the resistance terminals, viz, the terminal which is employed when no resistance is used. At the lower part of Figure 8 it will be seen that the four auxiliary coil terminals 91 are connected by diagonal wires 107 to bring the sets of auxiliary coils into parallel, and that another wire 108 leads from one of the upper auxiliaries to the lowest field terminal on the opposite edge of the plate, which is permanently connected to one of the mains 109. The other main is designated as 110, and is permanently connected to the other of the two lowest field coil contacts; the desired parallelism of the field coils being secured by cross wires 111 and series wiring 112. A wire 113 connects the left-hand lowest field contact at Figure 8 with the resistance contact, which is connected by permanent wire 106 to the armature circuit.

Figure 9 indicates the connections for alternating current, 40 cycles, 130 volts. Figure 9 shows the field coils connected separately across the line; all the field coils being in parallel to make it suitable for 130 volts, 40 cycles. To trace the connection of the field coils, it will be seen that the current coming down one main 110 passes up through coil 50 and returns through diagonal wire 114 to the other main 109. Again, the current flows from main 110 through diagonal wires 115, 116 to coil 49 and returns through diagonals 117, 118, 114 to main 109. Again, the current passes through main 110 across diagonal 115 to coil 52, and then back to the main 109. The current also flows through 110 and through diagonals 115, 116 and 119 to coil 51, and then through diagonals 118, 114 to the main 109. The auxiliary coils are connected to one another in the same manner, as shown in Figure 7. These auxiliary coils are here connected to oppose the field coils for reasons hereinbefore explained. One of the resistance coils 105 is shown as included in the armature circuit, to permit the use of the motor on 130 volt current; the same effect being produced as though the motor were running on 120 volts without any resistance, so that the desired speed is secured. If it were desired to use 140 volts instead of 130, another coil of the resistance would be cut in, as indicated by the wiring 120. If it were desired to cut down speed, certain of the auxiliary coils 66 to 73 would be cut in, as will be presently explained in connection with other diagrams.

In manufacturing the terminal plates and contact plates for any given voltage, frequency and speed, the contacts and wiring may be connected up by following the general principles herein outlined, and then the motor can be tested for speed. If the voltage is too high or low, resistance can be cut in or cut out; and if the speed is too high or low, one or more of the auxiliary coils may be cut in or cut out until substantially the desired speed is secured, whereupon the voltage, frequency and speed may be stamped upon the contact plate or device, which may be kept as a pattern. Then duplicates may be made of this plate or device and kept in stock, so that a motor may be supplied at any time to meet those conditions, without change in the motor.

It will also be understood that with direct current resistance is depended upon for taking care of both voltage and speed in making the final adjustments of a pattern plate or device. In other words, the motor is first rigged up to give approximately the desired result, and then the contacts in the pattern plate or device are shifted or placed, so as to get the final result desired; and this serves as a pattern for all contact plates or devices where the motor is to be used under those conditions. The same method may be followed in getting up every pattern contact plate or device.

Figure 10 shows the arrangement of contacts for effecting the connections seen at Figure 9. If connection is to be made at 120, the contact is placed as seen in dotted lines at 120$^a$, instead of in the full-line position, as at 110.

To produce a motor that will successfully operate in different circuits having different frequencies, it is wound for the highest frequency that is to be employed. The field coils may be connected in parallel across the mains, in order to secure a minimum inductance for use in circuits of the highest frequency, say 80 alternations per second. For the lowest frequency, say 25 or less, the field coils may be connected in series, so as to secure the highest inductance. For intermediate frequencies there is employed a multiplicity of field coils and auxiliary coils, preferably four field and eight auxiliary, the field coils being in parallel for highest and in series for lowest frequency. Consequently the inductance is least when all are in parallel and greatest when all are in series. For intermediate frequencies, two field coils may be in semi-parallel, that is, they may be connected in series with each other to form sub-sets, and each sub-set may be connected across the line, so that these sub-sets will be in parallel with each other. The eight coils in the auxiliary set may be arranged always with four in series, while each set of four may be connected either in series or parallel. This parallel arrangement of sub-sets is suitable for frequencies of say 35 to 45. Provision may thus be made for a great variety of frequencies, the inductance for the different frequencies being kept at such a point that the motor will take the desired current from the line. Since on lower frequencies the inductance is the least, it is increased by putting the coils in series; and since on higher frequencies the inductance is the greatest, it is decreased by putting the coils in parallel. Since more iron inside the coils makes more inductance, this will be taken into consideration in winding the coils and providing for shifting the connections. It is believed to be broadly new to shift the motor coils from parallel arrangement to series arrangement, to compensate for difference in frequency.

For high frequencies, say 50 cycles to 80 cycles, the field coils may be all in parallel. From 35 to 45, there may be parallel sub-sets of coils, each sub-set having two coils in series. For 30 and under, all coils may be in series. These combinations may be changed as required. For example, the arrangement for 50 cycles might serve for 40. With four field coils, enough combinations are possible to meet ordinary demands.

The arrangement of the auxiliary coils to oppose the main field coils secures the desired reduction of inductance in the main field coils, and therefore renders the motor more available for use with different frequencies where the power is to remain approximately the same.

Figure 11 shows a plate suitable for using the motor with an alternating current of 120 volts, 60 cycles. The field coils are connected individually in parallel, as at Figure 9. No resistance is cut in. The auxiliary coils are opposed to the field coils, as at Figure 9. However, the auxiliary coils 66 and 67, 72 and 73 are cut out, as will be readily understood from the wiring. These four auxiliary coils are cut out because higher frequency is employed. At Figure 11 no resistance is cut in and it corresponds in other respects with Figure 9.

Figure 12 shows the contact plate for securing the Figure 11 connections, and will be readily understood in view of the explanations of Figures 8 and 10.

Figure 13 shows the terminal plate in place in the head of the motor and ready for the attachment thereto of any of the contact plates seen in the various diagrams. The coils are indicated diagrammatically.

Figure 16 shows a contact plate that may be employed for connecting up the coils for direct current, 130 volts; the field coils being all in series, so as to secure enough windings to give the proper resistance. In other respects the connections may be the same as at Figures 7 and 8. The wire 121 at Figure 16 connects to the opposite ends of the rheostat from the permanent wire 106, the entire resistance being in series with the armature, on account of the increased voltage.

The voltage and frequency may be cut in half, using the same connections at Figure 24.

Figure 4$^a$ shows the contact plate for making the connections shown diagrammatically at Figure 6$^a$. The wire 121 is the same as at Figure 16, inasmuch as all of the resistance is cut in.

At Figures 6$^a$, 9 and 11, the auxiliary coils would oppose the field coils, and are correspondingly connected thereto by wires 122; while at Figures 7, 16, and other direct current diagrams, the connections between the sets of coils is made by a cross wire 108, so that all the field and auxiliary coils may work the same way.

Figure 20 is similar to Figure 9, except that all the resistance is cut out, since this plate is designed to adapt the motor for a lower voltage than the Figure 9 plate. Figure 20 is a plate for 120 volts, 40 cycles, alternating current.

Figure 21 shows the contact plate for securing the connections indicated at Figure 20. Figure 21 therefore corresponds to Figure 10 except in the matter of the resistance.

Figure 22 is for alternating current, 120 volts, 50 cycles, and corresponds with Figure 20 in every respect except that two of the series coils 66 and 73 are cut out in view of the increased frequency, for reasons above given.

Figure 23 shows the contact plate for securing the connections seen at Figure 22.

Figure 24 is a diagram for alternating current, 220 volts, 40 cycles; and Figure 25 the inverted contact plate. The field coils are in semi-parallel, as a compromise between the high windings called for by the high voltage, and the low windings called for by the intermediate frequency. If the coils were all in series, by reason of the high voltage, then the intermediate high frequency would make so much induction that the motor would not take sufficient current from the mains; therefore the compromise is made of having the coils in semi-parallel, so that too much inductance will not result from the intermediate frequency, while said frequency still produces enough inductance to overcome the overspeeding tendency of the high voltage, without making it necessary to have a large number of windings to oppose the high voltage.

It will be understood that to produce a motor that can be used for circuits having different voltages and different frequencies, as well as different voltages for the same frequency, the coil connections may be shifted. For lowest voltage the coils may be connected in parallel so as to keep down the inductance and resistance and enable the motor to take the desired power from the line. For highest voltage the coils would be connected in series so as to secure great inductance and resistance and prevent the motor from taking too much current. For different combinations of frequency and voltage, a corresponding combination of coils may be employed. In a circuit having high frequency and low voltage, the coils may all be in parallel. For low frequency and high voltage, they may all be in series. For other combinations of frequency and voltage, there are used corresponding connections of the coils. These combinations may be numerous and provide for the usual combination of voltage and frequency. There might be 30 or more combinations of the coils; but the windings remain always the same, and in all cases all of the field and armature windings may be used. In all cases the shifting of the auxiliary coils may follow the shifting of the field coils, for reasons already given. It will be perceived that all the wire may be utilized all the time in the field coils and in the armature coil, thus effecting economy of manufacture and space. Incidentally the connections of the auxiliary coils are shifted to correspond with the field coils; but even if some other means were used for fine speed regulation, the field coils may still be shifted as aforesaid for different frequencies. Auxiliary means may also be employed to reduce the voltage.

To adapt the motor for different speeds, it should be kept in mind that the auxiliary coils are opposed to the field coils. If the auxiliary coils were omitted, the armature would rotate in one direction under the influence of the main field coils; whereas, if the main field coils were omitted and the auxiliary coils were retained, the armature would be rotated in the opposite direction under the influence of the auxiliary coils. In other words, the tendency of the main field coils is to rotate the armature in one direction, while the tendency of the auxiliary coils is to rotate the armature in the opposite direction. When these opposing tendencies have a certain relationship, the motor automatically maintains a certain speed, for reasons hereinbefore given. If a higher speed is desired, then the number of turns in the auxiliary coils may be decreased, thus reducing the opposition to the main field coils, so that the armature is rotated more rapidly in the same direction. Thus, by cutting out or cutting in more turns in the auxiliary coils, the speed of the motor may be varied. After such adjustment, the motor automatically increases or diminishes in speed until the auxiliary coils again reach the proper balance or relationship with the main field coils. At any rate for which the motor may be designed to run, its speed will be kept finely regulated, as hereinbefore explained.

In regard to starting, it will be understood that when the armature is at rest it has maximum inductance. However, at the starting of the motor the field coils are stronger than the auxiliary coils, which, therefore, are acted upon by said field coils in the manner of the secondary of a transformer. The voltage induced in the auxiliary coils is in the same direction as the line voltage. Thus, the induced voltage of the auxiliary coils is added to the line voltage flowing through the armature coil at the moment that it has maximum inductance, whereby the effect of said inductance is substantially reduced, with the result that the armature starts instantly.

When starting, ordinary induction motors take such excessive current that the torque is increased two or three times, the taking of excessive starting current being objectionable. Starting of the present motor is almost instantaneous; and compares favorably with a single-phase induction motor. In most induction motors the starting torque is three times the load capacity, but in this novel motor it may be one and one-quarter times.

Figures 26 and 27 are companion views for direct current, 130 volts, all of the resistance being cut into the armature circuit, and the diagrams otherwise corresponding with Figure 16.

Figures 28 and 29 are companion views to illustrate direct current, 120 volts, the major part of the resistance being cut in and the field coils being in series.

Figures 30 and 31 are companion views of a plate to use the motor for direct current, 220 volts, corresponding largely with Figures 28 and 29, except that all of the resistance is cut into the armature circuit, and, in addition, an outside resistance 124 is cut into the main. 124 represents the resistance box as attached at any convenient place in the motor to be connected to the line circuit. This fixed external resistance is used for D. C. where the supply voltage is greater than that for which the motor is wound; this being practicable because the motor starts with series characteristics. When the motor is operated on direct current, its connections may be the same as those of a compound wound motor, connected long shunt, and having overwound series coils, equivalent to those of a straight series motor.

It is further noted that when the motor is to be altered from D. C. to A. C., it is necessary to parallel the shunt field coils so as to reduce the inductance of the circuit, and to reverse the connections of the auxiliary coils, which are also paralleled together and in series with the armature, so that the magnetic fields resulting from the shunt and auxiliary coils oppose each other, also reducing the inductance of the circuit, and causing the magnetism to go through the adjustable air gap or impediment and the laminated loop or keeper. This sets up a magnetic combination in the field magnet circuit itself, affecting the magnetism of the armature, which actually does hold the armature at a constant speed, with and without load; and the speed is adjustable, depending upon the number of turns in the auxiliary coils that are operating in series with the armature.

It will be seen that in providing a constant speed alternating motor that can be successfully used for direct current, the coils may remain, but the connections may be rearranged so that the auxiliary coils in series with the armature through the commutator are connected (reversely) across the mains, while the field coils are also connected across the mains, or in shunt around the armature and the auxiliaries.

However, the auxiliary coils are so connected that they help the field coils; in other words, the auxiliary coils, although in series with the armature, really operate as field coils in conjunction with the shunt field coils. To accomplish this, the connections may be reversed on the auxiliary coils from their position when used with alternating current. This gains several advantages. One advantage is that the magnetism of the field is augmented, and the main field coils, being in shunt around the armature, prevent the latter from overspeeding. The magnetic iron loops do not function on direct current. The auxiliary coils and field coils could be connected in parallel and multiple series, respectively, where a very low voltage is employed, say 50 volts.

The auxiliary coils are of value when the motor is used for direct current, because they are right in series with the armature, and would make a field even without the shunt field coils. The whole combination gives a good starting torque.

In order to obtain low speed on direct current, resistance is placed in series with the armature, and still further reduction of speed is obtained because the voltage drop across the armature is reduced by the use of such a resistance. The resistance also tends to prevent the armature from burning out when the motor is stalled.

The turns on the armature, being kept low for keeping down the inductance when used with alternating current, are found to be not sufficient in number for use in the ordinary way with a direct current, say 110 volts, when the same speed is desired on direct as on alternating current. For this reason, the aforesaid auxiliary coils are connected up to give part of the field magnetism, these coils being in series with the armature and offering substantial resistance, thereby reducing the voltage consumed by the armature. For additional reduction of voltage, there is also placed in the armature circuit a resistance. The speed of the motor on direct current may be determined by varying the resistance in the armature circuit.

Additional external resistance is placed in series with the whole motor. It would not be practicable to start an ordinary shunt motor with such external resistance in series with the whole motor. In other words, one resistance is placed in series with the armature for ordinary voltage, while an additional external resistance for high voltage is in series with the whole motor, which still has a good starting torque, which would not be practicable in an ordinary shunt motor. This torque is partly due to the fact that there are many more turns of wire in the series field than are ordinarily used in a standard form of compound wound motor. While this outside resistance tends to reduce the efficiency of the main field coils while the motor is starting, still the current that goes through the armature must necessarily go through the auxiliary field coils, whereby enough field magnetism is secured to enable the motor to start.

When constructing the motor in one way, each of the four shunt field coils may have twice the number of turns, to agree with the number of effective turns on the armature, that is, to equal the total armature turns. The total number of turns of all eight auxiliary coils may also be equal to twice the number of effective turns on the armature. The armature wire may be one-half the circular mil area of the wire used for the series coils. The shunt coil wire may be one-fourth the circular mil area of the wire used for the auxiliary coils. Other equations may be employed.

In order to increase the speed of the motor, to make it say 1800 instead of 1200 R. P. M., certain resistance may be cut out when using motor for D. C. If used for A. C., then fewer of the auxiliary coils may be employed. Such results may be secured by using plates having appropriate contacts. At high speed the efficiency of the motor is very high, and it may be given a higher rating. The greatest efficiency is secured when the motor is operating on direct current. When used on alternating current, the motor is more powerful on the lower frequencies than on the higher, if run at the same speed. Increase of the current in the auxiliary coils, which oppose the field coils, tends to reduction of the speed of the armature, while increasing the current in the field circuit tends to increase the capacity or torque of the motor.

At Figure 6ª is shown the manner of connecting for alternating current, 220 volts, 30 cycles, but it will be understood that this can also be used for 150 volts, 20 cycles. The field coils are in series because of the low frequency and the high voltage. This illustrates another case for the low frequency demand for putting all the coils in series and the high voltage demand for also putting them all in series to secure sufficient inductance and resistance.

In place of an air gap, another form of magnetic resistance or impediment may be employed; as, for example, that shown at Figures 18 and 19. This form consists of a wide copper ring, tube or jacket 125 surrounding the iron loop 75. This is preferably made of a helical winding of a copper wire of proper thickness, the whorls being soldered together, so that the jacket consists of a single wide ring. The current induced in this jacket or ring produces a magnetism which opposes the magnetism passing through the iron loop, and hence this jacket constitutes a magnetic impediment.

It will be understood that by substituting contact plates, the D. C. arrangement illustrated at Figure 26 may be used for other voltages, down to 90; that at Figure 7 for voltages of from 85 down to 45; that at Figure 28 from 130 to 90; and that at Figure 30 from 250 down to 130. The A. C. arrangement at Figure 20 may likewise be used for from 45 to 85 volts, 20 to 35 cycles; or from 90 to 160 volts and 40 to 80 cycles; or from 185 to 250 volts and 85 to 140 cycles. So also with the other A. C. arrangements shown; the higher the voltage the greater the number of cycles as a general thing.

It will thus be seen that in practicing certain of the improvements, only a few motors need be kept in stock, whereas a great variety of wants may be readily supplied by merely keeping in stock an assortment of relatively simple and inexpensive contact plates. Confusion and mistakes in the use of the plates are avoided because each one may be plainly marked with the appropriate designations. It will also be seen that where the owner of a motor has occasion to use the same in a different circuit or for different speed or frequency, etc., he needs only to secure from the dealer an appropriate plate and substitute it for the old plate on the motor, whereupon it is ready for use in the new environment, thus avoiding the necessity of purchasing a new motor. When the user has to employ the motor in a variety of circuits, as in the case of a portable machine, he may purchase a motor with a complete set of contact plates, so that he can use it under all ordinary conditions. The connections are made automatically, by fastening the appropriate contact plate in position, whereupon the contacts make the necessary connections. An unlimited number of combinations may be set up.

Wide variations may be made within the scope of the invention, as for example, the field coils may be transposed with the auxiliary coils, and the invention may be used with other magnets than the double horse-shoe type illustrated; and portions of the improvements may be used without others, as, for example, the motor altering devices or contact plates may be used only for alternating current if desired. As another example, the speed regulating means for an alternating motor may be employed whether or not any contact plate is used.

Having thus described my invention, I claim:

1. A convertible electric motor, comprising exciting and working windings, terminals connected severally to said windings, a terminal-supporting member, and removable means comprising contacts for engaging said terminals forming a predetermined system of connections for the motor.

2. A convertible electric motor, comprising a motor-frame, exciting and working windings, terminals connected severally to said windings, a supporting member for said terminals, affixed to the motor-frame, and removable means, comprising contacts for engaging said terminals, interconnected so as to effect connection of the armature and working and exciting windings in a predetermined relation.

3. In an electric constant-speed motor, the combination of an armature, a field magnet, field working windings, auxiliary exciting windings in series with the armature, the ends of said windings being brought out as contact terminals, and removable means, comprising electric contacts engaging said terminals, and wired together in such an electric connection arrangement as to form a predetermined system of connections for the motor that when said electric contacts electrically engage said contact terminals, said motor is thereby adapted or converted for operation on a given kind of current in contradistinction from being operated on a kind of current different from said given kind of current.

4. In an electric motor, the combination of an armature, a field magnet, main field coils connected across the main supply line, and auxiliary coils connected in series with the armature, and placed on the core of the magnet and located between the poles of the field magnet with their magnetic field in opposition to the magnetic field of the field coils.

5. In an alternating current motor, the combination of an armature, a field magnet, shunt field coils, and auxiliary coils connected in series with the armature, and placed on the core of the magnet and located between the poles of the field magnet with their magnetic field in opposition to the magnetic field of the field coils.

6. In a convertible electric motor, the combination of an armature, a field magnet, shunt field windings, auxiliary windings in series with the armature, the ends of said windings being brought out as contact terminals, and removable means, comprising electric contacts, for engaging said terminals, interconnected so as to effect connection of the armature and said windings in a predetermined relation.

7. In an alternating current motor, the combination of an armature, a field magnet core, and field and auxiliary coils on said core, said auxiliary coils being placed on the core of the field magnet between the field coils, the field coils connected across the main line, and the auxiliary coils connected in series with the armature in opposition to the field coils, whereby the electromotive force induced in the auxiliary coils is added to the main line voltage in forcing current through the armature.

8. A convertible electric motor, comprising exciting and working windings, a supporting block, terminals for said windings brought out to a head and supported in said block, said terminals connected severally to said windings, and an electric-circuit-connecting element, comprising a plate provided with electric contacts, certain of which are interconnected, and engage the terminals, said electric-circuit-connecting element affixed to said supporting block.

9. In an alternating current motor, the combination of an armature, a field-magnet core, field and auxiliary coils on said core, the auxiliary coils placed on said magnet core between the field coils, the field coils being connected across the main line, and the auxiliary coils being connected in series with the armature in opposition to the field coils, and an iron keeper partly surrounding the auxiliary coils, arranged in the direction of the magnetic lines of force of the auxiliary coils.

10. The combination of an armature, a magnet core, field coils surrounding the core, and auxiliary coils also surrounding the core and opposed to the field coils and connected in series with the armature, the auxiliary coils being co-operative with the field coils to secure speed regulation of the motor, and means constituting a by-pass comprising an air gap extended around the auxiliary coils for flux.

11. In an alternating current motor, the combination of an armature, a field magnet core, shunt field coils, and auxiliary coils, the latter connected in series with the armature, and placed on the field magnet core between the field coils, and the auxiliary coils connected to the main supply circuit so as to oppose the field coils, and spaced apart from the field coils, whereby a flux path is provided about the auxiliary coils.

12. The combination of an armature, a core device, field coils surrounding the core, and auxiliary coils also surrounding the core and opposed to the field coils and connected in series with the armature, the auxiliary coils being co-operative with the field coils to secure speed regulation of the motor, said field coils being in shunt around the auxiliary coils and armature, said core being annular or continuous, and said auxiliary coils wound around said core, the core being provided with by-passes or loops extending around the auxiliary coils, whereby the metallic magnetic circuit is made less incomplete.

13. In an alternating current motor, the combination of an armature, shunt field coils, auxiliary coils, a magnet core common to both field and auxiliary coils, the auxiliary coils connected in series with the armature, and placed between the field coils, both field and auxiliary coils located on said magnet core, and the auxiliary coils connected to the supply circuit through the armature, the magnetic lines of force of the auxiliary coils opposing the lines of force of the field coils, and an iron keeper partly surrounding the auxiliary coils, with an air gap between the keeper and said magnet core, whereby the lines of force of both sets of coils pass through said air gap and keeper, and keep the phases of the armature and field circuits in phase with each other.

14. The combination of an armature, a core device, field coils surrounding the core, and auxiliary coils also surrounding the core and opposed to the field coils and connected in series with the armature, the auxiliary coils being co-operative with the field coils to secure speed regulation of the motor, said field coils being in shunt around the auxiliary coils and armature, said core being annular or continuous, and said auxiliary coils wound around said core, the core being provided with by-passes or loops extending around the auxiliary coils, the magnetic circuit for each auxiliary coil including one of the loops, and also including that part of the main core around which the auxiliary coil is wound, and the magnetic circuit for the field coils consisting partly of the main core and partly of said loops, the direction of the magnetism in the loops being the same for the oppositely working coils.

15. In an electric motor, the combination of an armature, a double U-shaped field magnet having neck portions near its poles, separate field coils, on the neck of each leg of said magnet, two coils at each pole, and all the field coils connected in circuit together across the line.

16. The combination of an armature, a core device, field coils surrounding the core, and auxiliary coils also surrounding the core and opposed to the field coils and connected in series with the armature, the auxiliary coils being co-operative with the field coils to secure speed regulation of the motor, said field coils being in shunt around the auxiliary coils and armature, said core being annular or continuous, and said auxiliary coils wound around said core, the core being provided with by-passes or loops extending around the auxiliary coils, the magnetic circuit for each auxiliary coil including one of the loops, and also including that part of the main core around which the auxiliary coil is wound, and the magnetic circuit for the field coils consisting partly of the main core and partly of said loops, the direction of the magnetism in the loops being the same for the oppositely working coils, said loops provided with magnetic impediments to secure sufficient reaction of the oppositely working coils upon each other through the main core, to secure phasing of the field circuits with the armature circuit, and thereby secure speed regulation.

17. In an electric motor, the combination of an armature, a double U-shaped field magnet having neck portions near its poles, separate field coils, on the neck of each leg of said magnet, two coils at each pole, and all the field coils connected in circuit together across the line, and auxiliary series coils, placed midway between the poles of said magnet and forming separate magnets with a part of their magnetic field forming a part of the magnetic field of the field coils, and said auxiliary coils connected in circuit with the armature.

18. In an electric motor, the combination of an armature, a double U-shaped field magnet having neck portions near its poles, separate field coils, on the neck of each leg of said magnet, two coils at each pole, all the field coils connected in circuit together across the line, and auxiliary series coils, placed midway between the poles of said magnet and forming separate magnets with a part of their magnetic field forming a part of the magnetic field of the field coils, and said auxiliary coils connected in circuit with the armature, and an iron keeper placed partly around said auxiliary coils, with air gaps between the ends of the keeper and said magnet.

19. The combination of an armature, a core device, field coils surrounding the core, and auxiliary coils also surrounding the core and opposed to the field coils and connected in series with the armature, the auxiliary coils being co-operative with the field coils to secure speed regulation of the motor, said field coils being in shunt around the auxiliary coils and armature, said core being annular or continuous, and said auxiliary coils wound around said core, the core being provided with by-passes or loops extending around the auxiliary coils, and having means for determining the reluctance thereof, to fix the mutual inductance of said field and auxiliary coils.

20. In an electric motor, the combination of the armature, field magnet coils, and auxiliary coils, and contact heads, connected to and constituting the terminals for the motor windings, an insulation plate sustaining said heads, and another insulation plate having electric contacts engaging said heads, said contacts being interconnected together by electric conductors, so as to connect the field coils across the main supply line and auxiliary coils in series with the armature, but with the connection reverse to that of the field coils.

21. A motor wound for alternating current and having an annular or continuous magnet having diametrically opposite poles, two field coils at each pole of the magnet, said field coils connected across the mains, auxiliary coils being arranged at the sides of the motor, the auxiliary coils being connected in series with the armature across the mains, and connected to oppose the field coils, said auxiliary coils located on the middle side portions of the annulus, and iron loops or by-passes branching from the annular magnet around the auxiliary coils, and provided with magnetic impediments, each of said coils being wound separately and placed as a unit upon the magnet core.

22. A motor wound for alternating current and having an annular or continuous magnet core formed of quadrants and having diametrically opposite poles, two field coils at each pole of the magnet, said field coils connected across the mains, and auxiliary coils arranged at the sides of the motor, the auxiliary coils being connected in series with the armature across the mains, and connected to oppose the field coils, said auxiliary coils located on the middle side portions of the annulus, and iron loops or by-passes branching from the annular magnet around the auxiliary coils, and provided with magnetic impediments, said loops having lugs, and clips placed over the lugs, said clips being extended and constituting interpoles.

23. A convertible motor, comprising the combination of the armature, armature windings, a magnet core, and a plurality of main field windings on said core, a plurality of auxiliary windings also placed on said core and between the field windings, each of said field and auxiliary windings being provided with a separate terminal, and a terminal board on which the terminals are mounted, whereby the motor is adapted for connection with the field windings in parallel or series across the line, or with the auxiliary windings in series with the armature across the line and to oppose the action of the field windings.

24. A motor having shunt field coils, an armature and wound for alternating current but alterable for use with a direct current, and provided with resistance in series with the armature for regulating the motor and also having auxiliary exciting coils in series with the armature coil to provide still further resistance, said auxiliary coils being connectible either to work the same way as said field coils for direct current, or to work in opposition to said field coils for alternating current, for the purpose specified, and additional resistance connectible to the mains, for reducing or lowering the voltage of the motor.

25. A motor wound for alternating current and having an armature, an annular or continuous magnet, field coils at the poles of the magnet, and connected across the mains, auxiliary coils at the sides of the magnet, said auxiliary coils being connected in series with the armature across the mains, and connected to oppose the field coils and placed on the middle portions of the annulus, iron loops or by-passes branching from the annular magnet around the auxiliary coils, and provided with magnetic impediments, wooden insertions between the loops and the main magnet, and straps to hold the loops against the insertions.

26. A motor wound for alternating current and having an annular or continuous laminated magnet, two field coils at each pole of the magnet, said field coils capable of connection in either series, parallel or semi-parallel arrangement at each pole, all the field coils being connected across the mains, the pole-pieces of the magnet comprising neck portions, and each field coil occupying a position between the neck and the body portion of the magnet, said field coils occupying notches formed in the magnet, each coil in the form of an elongated loop, each of said coils being wound separately and placed as a unit upon the magnet, the magnet being made of four portions in the form of similar quadrants, a casing in which said quadrants are supported, said quadrants having lugs, and clips being placed over the lugs, said clips being extended and constructed to form interpoles, four auxiliary coils at each side of the motor and placed as units over sections of the magnet, the magnet having cut-away portions to give room for the auxiliary coils, said auxiliary coils being connected in series with the armature across the mains and capable of working in the same way as the field coils when the motor is used for direct current, and also capable of connection to oppose the field coils when the motor is used for alternating current, means being provided for cutting out certain of the auxiliary coils, said auxiliary coils forming the middle portion of the annulus at each side into a separate magnet when used for alternating current, laminated iron loops or by-passes branching from the annular magnet around the auxiliary coils, and provided with gaps or magnetic impediments, said casing having openings in which said loops are arranged, wooden insertions between the loops and the main magnet, and straps to hold the loops adjustably against the insertions.

27. A motor wound for alternating current and having a field magnet, a plurality of field coils connectible across the mains in either series or parallel relation, an armature, an armature coil, and a plurality of auxiliary coils placed on the core of the field magnet and in series with the armature coil, and connectible variably to correspond with the connections of the field coils, and co-operative with the field coils and armature to regulate the speed of the motor.

28. An alternating current motor including an armature coil, field windings in shunt around the armature, and auxiliary windings in series with the armature for regulating the motor speed, said auxiliary windings connected to oppose said field windings, and a magnet having a magnetic return path common to all of said windings and provided with a magnetic impediment.

ALFRED E. OSWALD.